US010710530B2

(12) United States Patent
Du et al.

(10) Patent No.: US 10,710,530 B2
(45) Date of Patent: Jul. 14, 2020

(54) ADJUSTABLE BRACKET FOR INSTALLATION OF A VEHICLE BUMPER

(71) Applicants: Compagnie Plastic Omnium, Lyons (FR); Yanfeng Plastic Omnium Automotive Exterior Systems Co., Ltd., Shanghai (CN)

(72) Inventors: Hailong Du, Shanghai (CN); Guojun Huang, Shanghai (CN); Gonglang Hu, Shanghai (CN)

(73) Assignees: Compagnie Plastic Omnium (FR); Yanfeng Plastic Omnium Automotive Exterior Systems (CN)

( * ) Notice: Subject to any disclaimer, the term of this patent is extended or adjusted under 35 U.S.C. 154(b) by 8 days.

(21) Appl. No.: 16/073,160

(22) PCT Filed: Jan. 25, 2017

(86) PCT No.: PCT/CN2017/072559
§ 371 (c)(1),
(2) Date: Jul. 26, 2018

(87) PCT Pub. No.: WO2017/129123
PCT Pub. Date: Aug. 3, 2017

(65) Prior Publication Data
US 2019/0039542 A1  Feb. 7, 2019

(30) Foreign Application Priority Data

Jan. 26, 2016 (CN) .................... 2016 2 0076949 U

(51) Int. Cl.
*A47B 96/06* (2006.01)
*B60R 19/24* (2006.01)

(52) U.S. Cl.
CPC ........ *B60R 19/24* (2013.01); *B60R 2019/245* (2013.01)

(58) Field of Classification Search
CPC .. B60R 19/24; B60R 2019/245; B60Q 1/0425
(Continued)

(56) References Cited

U.S. PATENT DOCUMENTS

| 9,016,643 | B2* | 4/2015 | Sterling | B60D 1/488 248/200 |
| 2005/0088015 | A1* | 4/2005 | Kishikawa | B60Q 1/0425 296/193.09 |

FOREIGN PATENT DOCUMENTS

| CN | 1623840 A | 6/2005 |
| CN | 103221265 A | 7/2013 |

(Continued)

OTHER PUBLICATIONS

Supplemental European Search Report and Search Opinion dated May 23, 2019 for related European application EP 17 74 3738.

*Primary Examiner* — Todd M Epps
(74) *Attorney, Agent, or Firm* — St. Onge Steward Johnston & Reens, LLC

(57) ABSTRACT

An adjustable bracket for installation of a vehicle bumper on a body of a vehicle is provided. The bracket is configured to be connected to the body to support the bumper, characterized in that the bracket includes a fixed bracket and an adjusting bracket, wherein the bracket has a movable connection between the fixed bracket and the adjusting bracket, which allows the adjusting bracket to have a translational movement in the vertical direction of the vehicle with respect to the fixed bracket, and wherein the adjusting bracket is provided at its top with position-limiting means which can abut against a light of the vehicle, and wherein the fixed bracket and the adjusting bracket are both provided with a mounting structure fastened to the same body. The adjustable bracket enables the bumper to be vertically positioned by the adjusting bracket, which controls the matching (Continued)

clearance between the bumper and the light, thereby effectively reducing the risks of uneven match between the light and the bumper.

10 Claims, 3 Drawing Sheets

(58) Field of Classification Search
USPC ... 248/228.1, 220.21, 220.22, 274.1, 295.11; 296/193.09
See application file for complete search history.

(56) References Cited

FOREIGN PATENT DOCUMENTS

| | | |
|---|---|---|
| CN | 203381581 U | 1/2014 |
| CN | 103612666 A | 3/2014 |
| CN | 104057871 A | 9/2014 |
| CN | 204978512 U | 1/2016 |
| CN | 205345051 U | 6/2016 |
| DE | 10237454 B3 | 2/2004 |
| DE | 102007032929 A1 | 2/2008 |
| EP | 0677430 A1 | 10/1995 |

* cited by examiner before assemblage          after assemblage

ADJUSTABLE BRACKET FOR INSTALLATION OF A VEHICLE BUMPER

FIELD OF THE INVENTION

The present invention relates to a bracket for installation of a vehicle bumper, and more particularly to an adjustable bracket for installation of a vehicle bumper.

BACKGROUND OF THE INVENTION

At present, in order to guarantee a good match between a vehicle bumper and a light (taillight or headlight of the vehicle), as well as a rear door of the vehicle in case of a rear bumper, a bracket is usually directly positioned and installed onto a body (or structure) of the vehicle before installing the bumper on the bracket. In such an assembling manner, the bracket is vertically positioned with respect to the vehicle body, and the rear bumper is vertically positioned with respect to the bracket. To increase the strength of the bracket and ensure the supporting effect, the bracket and side brackets of the taillight are usually made into a one-piece structure, through a rear or front part and a lateral part made as a one-piece structure. However, it often turns out that the light and the bumper skin are poorly matched, so it is necessary to provide an adjustable bracket to adjust the clearance between the bumper skin and the light. The one-piece structured bracket can hardly be adjusted separately by a single part of the bracket for instance the rear/front part of the bracket due to its deformation. Thus, how to achieve the supporting function of a plastic bracket and meanwhile make it adjustable separately is an urgent problem to be solved. The present invention develops a new plastic bumper bracket to solve the above problem.

SUMMARY OF THE INVENTION

To overcome the defects in the prior art, the present invention provides an adjustable bracket for installation of a vehicle bumper on a body of the vehicle, the bracket being configured to be connected to the body to support the bumper, characterized in that the bracket comprises a fixed bracket and an adjusting bracket,
  wherein the bracket comprises a movable connection between the fixed bracket and the adjusting bracket, which allows the adjusting bracket to have a translational movement in the vertical direction of the vehicle with respect to the fixed bracket, and
  wherein the adjusting bracket B is provided at its top with position-limiting means which can abut against a light of the vehicle, and
  wherein the fixed bracket and the adjusting bracket are both provided with a mounting structure fastened to the same body.

The term "body" here should be understood as the body of a vehicle, sometimes also called "body shell", which is a rigid structure of the vehicle including usually a non-deformable survival cell so as to protect the passengers in case of impact.

According to one embodiment, the present invention provides an adjustable bracket for installation of an adjustable bracket for installation of a rear bumper, which is connected between a rear bumper and a body, as well as a taillight, of a vehicle. Preferably, the bracket comprises a fixed bracket A connected between the rear bumper and the tail board, and an adjusting bracket B connected between the body of the fixed bracket and the taillight. Even more preferably, the adjusting bracket B is provided at its front end with a connecting structure that matches and is slidable relative to the fixed bracket A, the adjusting bracket B is provided at its top with position-limiting bosses that match the taillight, and the fixed bracket A and the adjusting bracket B are both provided at a side with a mounting structure fastened to the same tail board.

In a preferred embodiment of the invention, the fixed bracket and the adjusting bracket each comprise connecting means which are vertically slidable one to another. Here "vertically" means the vertical direction of the vehicle.

Advantageously, the fixed bracket is provided with two cross ribs, and the connecting means of the adjusting bracket is a vertically elongate opening which matches the cross ribs.

In another preferred embodiment of the invention, the bracket comprises a connection portion, which is made of flexible material and connects the fixed bracket and the adjusting bracket.

Advantageously, the mounting structure comprises a position-limiting pin and holes, particularly screw holes, arranged in the position-limiting pin for a fixed connection with the body.

Advantageously, the fixed bracket and the adjusting bracket are both provided on their top surfaces with upwardly protruding positioning bosses.

According to an aspect of the invention, the fixed bracket, the adjusting bracket and the body are fixedly connected to each other in turn, particularly by self-tapping screws and plastic nut seats.

According to the present invention, firstly the fixed bracket is attached to the body of the vehicle by the mounting structure, with either the adjusting bracket being connected to the fixed bracket by the flexible connection portion or the adjusting bracket being assembled to the fixed bracket by the connecting means. At this time, the adjusting bracket is vertically movable relative to the fixed bracket. Meanwhile, it shall ensure that the top surface of the adjusting bracket is lower than the position of the light. Then, the adjusting bracket is vertically moved, until the position-limiting means thereon abuts a bottom surface of the light. Since the light is prior fixed to the vehicle body, the clearance between the bumper skin and the light can be controlled by adjusting the moving distance of the adjusting bracket. Finally, the adjusting bracket is fixed to the body by the mounting structure, thereby obtaining an optimal clearance matching between the bumper skin and the light, and making the installation more convenient and stable.

DETAILED DESCRIPTION OF THE INVENTION

To deeply understand the technical means and features of the present invention, detailed explanation is given by way of examples with reference to the drawings. A preferred embodiment of the present invention will be described in detail for an adjustable bracket for a rear bumper. It can be understood that other examples such as an adjustable bracket for a front bumper, fall within the protection scope of the present invention.

Figure 1:
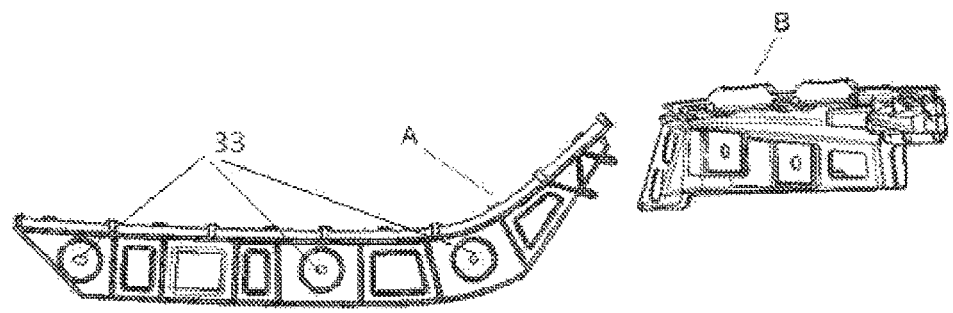
FIG. 1 is an exploded view of an adjustable bracket according to the present invention.
Figure 2:
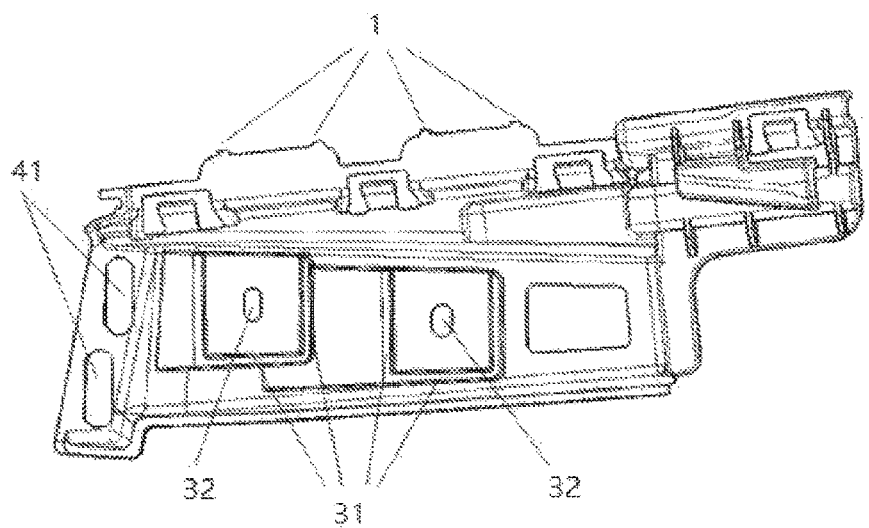
FIG. 2 is a structural schematic view of the adjusting bracket according to the present invention.

An adjustable bracket for installation of a vehicle rear bumper according to the present invention is connected between the rear bumper and a body of the vehicle. As shown in FIG. 1, the bracket comprises a fixed bracket A connected between the rear bumper (not shown) and the body (not shown), and an adjusting bracket B connected between the rear bumper and the body and under a taillight. As shown in this embodiment, the fixed bracket A and the adjusting bracket B are separate parts and assembled together. It can be understood that in other embodiment the fixed bracket A and the adjusting bracket B might be one-pieced part with a connection portion between them. The fixed bracket A and the adjusting bracket B will be described in detail as follows:

FIG. 2 shows the specific structure of an exemplary embodiment of the adjusting bracket B, which is provided at its front end with a connecting means 41 connected to the fixed bracket A, as shown in FIG. 2, wherein the connecting means 41 in shape of vertically elongate openings 41 cooperates with cross ribs 42 of the fixed bracket A, in such a manner that the adjusting bracket B can be vertically moved relative to the fixed bracket A. Meanwhile the fixed bracket A provides a positioning in the transversal and/or longitudinal direction of the vehicle to the adjusting bracket B.

In addition, the adjusting bracket B is provided at its top with vertical position-limiting means 1 for vertically positioning the adjusting bracket B relative to the taillight during the actual assembling process. The adjusting bracket B is also provided with a mounting structure 31, 32 connected with the body. The mounting structure comprises a position-limiting pin 31 used to be positioned with respect to the body and a kidney-shaped screw hole 32 arranged in the pin and used to be fixed with the body.

Figure 3:
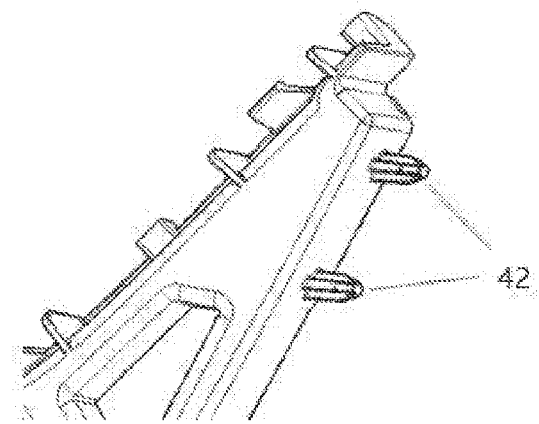
FIG. 3 is a local enlarged view of the fixed bracket according to the present invention.

FIG. 3 shows a connecting means arranged on the fixed bracket A and connected with the adjusting bracket B. The connecting means comprises two cross ribs 42, with a guiding structure on its top to facilitate the assembly with the vertically elongate openings 41 of the adjusting bracket B.

Additionally, one end of the cross rib has a position-limiting function for holding the adjusting bracket B in position after the assemblage, thereby ensuring the proper assembly of the rear bumper (not shown) with the adjusting bracket B.

Figure 4:
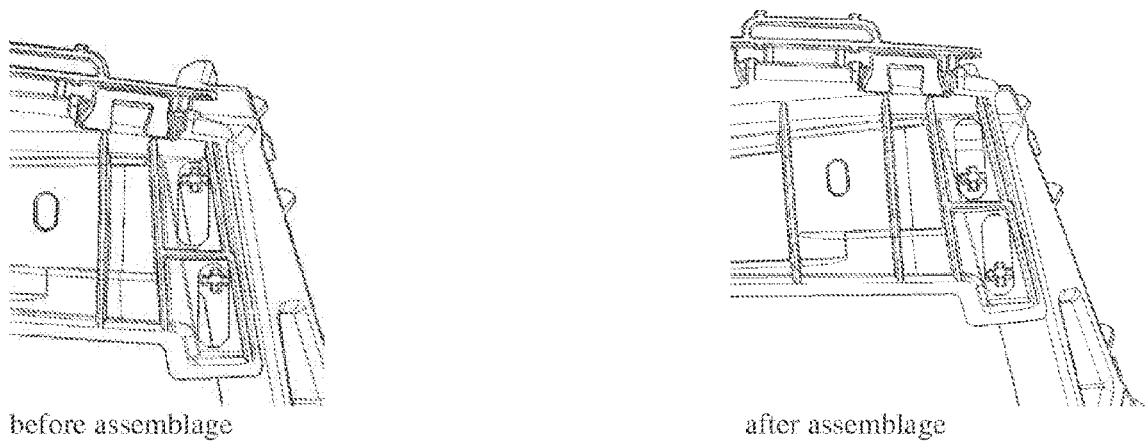
FIG. 4 is a local enlarged view of the adjusting bracket according to the present invention.

FIG. 4 shows a specific structure of an exemplary embodiment of the adjusting bracket according to the present invention. As shown, the fixed bracket A is first fixed to the body by screws before the assemblage, and then the adjusting bracket B is connected to the fixed bracket A through the connecting means. Finally, the adjusting bracket B is vertically moved until the position-limiting means 1 on its top abuts the bottom of the taillight 2. The assemblage is finished.

Figure 5:
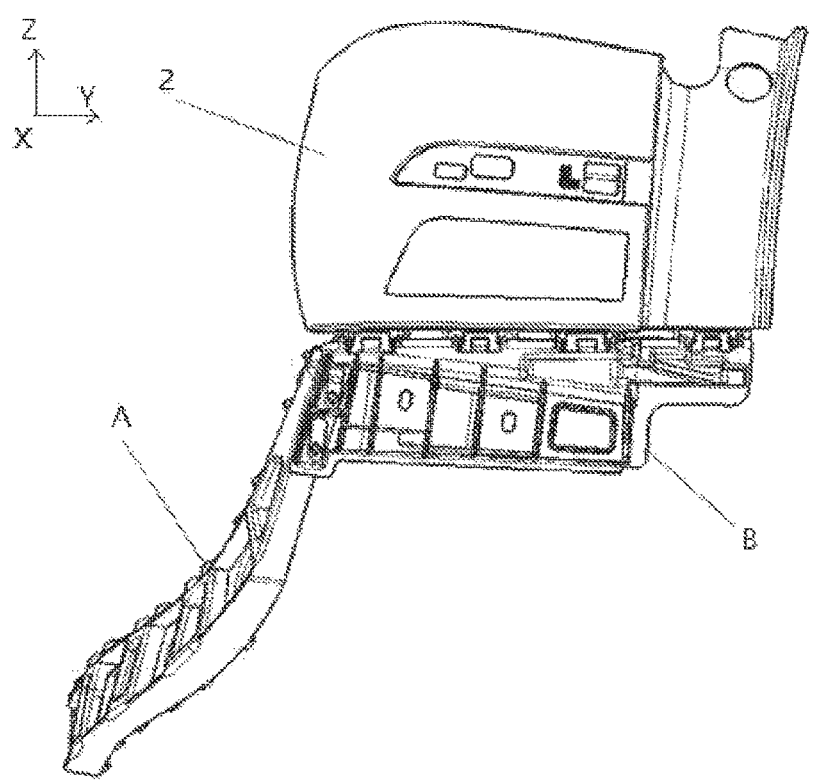
FIG. 5 is a holistic structural schematic view showing the assembling process of the present invention.

FIG. 5 shows the operation process of the present invention, the details of which are presented as follows:

Firstly, the fixed bracket A is connected to the body by screws, and then the adjusting bracket B is attached to the fixed bracket A by the connecting means 41, 42, ensuring that the top of the adjusting bracket B shall be lower than the bottom surface of the taillight 2. Then, the adjusting bracket B is vertically moved until the position-limiting means on its top abuts the bottom surface of the taillight 2. Finally, the adjusting bracket B is fixed with the body by self-tapping screws passing through the kidney-shaped holes 31 and the plastic nut seats.

The above contents are merely preferred embodiments of the present invention and not intended to limit the scope of the present invention. Variations can be made to the above embodiments of the present invention. Any simple and equivalent variation and modification made according to the claims and description of the present invention falls within the protection scope of the claims of the present invention.

The invention claimed is:

1. An adjustable bracket for installation of a vehicle bumper on a body of a vehicle comprising:
   a bracket being configured to be connected to the body to support the vehicle bumper, and the bracket comprises a fixed bracket and an adjusting bracket,
   wherein the bracket comprises a movable connection between the fixed bracket and the adjusting bracket, which allows the adjusting bracket to have a translational movement in a vertical direction of the vehicle with respect to the fixed bracket, and
   wherein the adjusting bracket is provided at its top with a position-limiting device which can abut against a light of the vehicle, and
   wherein the fixed bracket and the adjusting bracket are both provided with a mounting structure fastened to the body.

2. The bracket according to claim 1, wherein the fixed bracket and the adjusting bracket each comprise a connecting device which are vertically slidable one to another.

3. The bracket according to claim 2, wherein the fixed bracket is provided with two cross ribs, and the connecting device of the adjusting bracket is a vertically elongate opening which matches the cross ribs.

4. The bracket according to claim 1, comprising a connection portion, made of flexible material and configured to connecting the fixed bracket and the adjusting bracket.

5. The bracket according to claim 1, wherein the mounting structure comprises a position-limiting pin and holes, particularly screw holes, arranged in the position-limiting pin for a fixed connection with the body.

6. The bracket according to claim 1, wherein the fixed bracket and the adjusting bracket are both provided on their top surfaces with upwardly protruding positioning bosses.

7. The bracket according to claim 1, wherein the fixed bracket, the adjusting bracket and the body are fixedly connected to each other in turn, particularly by self-tapping screws and plastic nut seats.

8. The bracket according to claim 1, which is connected between a rear bumper, a body, and a taillight of a vehicle.

9. The bracket according to claim 8, wherein the fixed bracket is connected between the rear bumper and the body, and the adjusting bracket is connected between the body of the fixed bracket and the taillight.

10. The bracket according to claim 9, wherein the adjusting bracket is provided at its front end with a connecting structure, configured to be slidably engaged with the fixed bracket, the adjusting bracket is provided at its top with position-limiting ribs which match the taillight, and the fixed bracket and the adjusting bracket are both provided at a side with a mounting structure fastened to the same body.

* * * * *

UNITED STATES PATENT AND TRADEMARK OFFICE
CERTIFICATE OF CORRECTION

PATENT NO. : 10,710,530 B2  
APPLICATION NO. : 16/073160  
DATED : July 14, 2020  
INVENTOR(S) : Hailong Du et al.

Page 1 of 1

It is certified that error appears in the above-identified patent and that said Letters Patent is hereby corrected as shown below:

On the Title Page

At applicants (71):
"Compagnie Plastic Omnium, Lyons" should be changed to -- Compagnie Plastic Omnium, Lyon --

Signed and Sealed this  
First Day of September, 2020

Andrei Iancu  
*Director of the United States Patent and Trademark Office*